United States Patent [19]
Courty

[11] 3,738,169
[45] June 12, 1973

[54] ULTRASONIC FLOWMETERS
[75] Inventor: Albert Courty, Paris 16 eme, France
[73] Assignee: Thomson-CSF, Paris, France
[22] Filed: Feb. 11, 1971
[21] Appl. No.: 114,644

[30] Foreign Application Priority Data
Feb. 17, 1970 France .............................. 7005589

[52] U.S. Cl. ............................................. 73/194 A
[51] Int. Cl. ........................... G01f 1/00, G01p 5/00
[58] Field of Search ...................... 73/194 A, 290 V

[56] References Cited
UNITED STATES PATENTS
| | | | |
|---|---|---|---|
| 3,336,801 | 8/1967 | Snavely | 73/189 |
| 3,402,606 | 9/1968 | Bruha | 73/194 A |
| 3,440,876 | 4/1969 | Hayes et al. | 73/194 A |
| 3,486,377 | 12/1969 | Franchi | 73/290 V |

Primary Examiner—Charles A. Ruehl
Attorney—Cushman, Darby & Cushman

[57] ABSTRACT

An ultrasonic flowmeter in which the flow velocity of a fluid through a pipe is measured by comparison of the propagation times of an acoustic wave over oblique trajectories, in both the upstream and downstream directions. A feedback loop comprising an additional transducer pair located on opposite sides of the pipe and transversally thereto and an amplifier delivers a pulsed signal whose repetition frequency is proportional to the velocity of sound in the fluid. An error voltage whose variations are proportional to the frequency of the pulsed signal is derived by means of a discriminator and applied to the control input of a voltage controlled oscillator through a squaring circuit. Pulses derived from the oscillator are counted in a counter during a time interval corresponding to the difference between the upstream and downstream propagation times.

6 Claims, 8 Drawing Figures

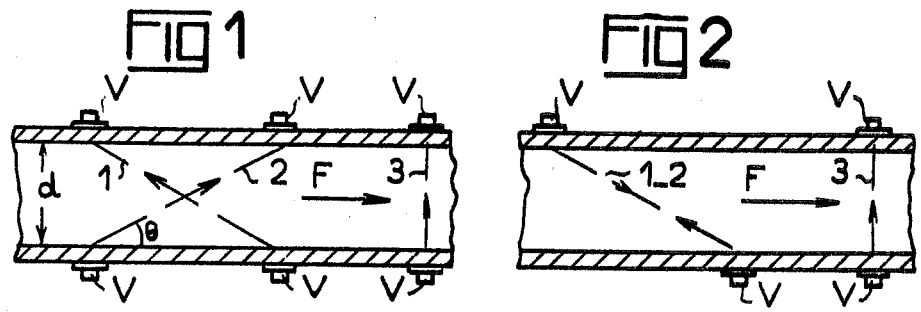
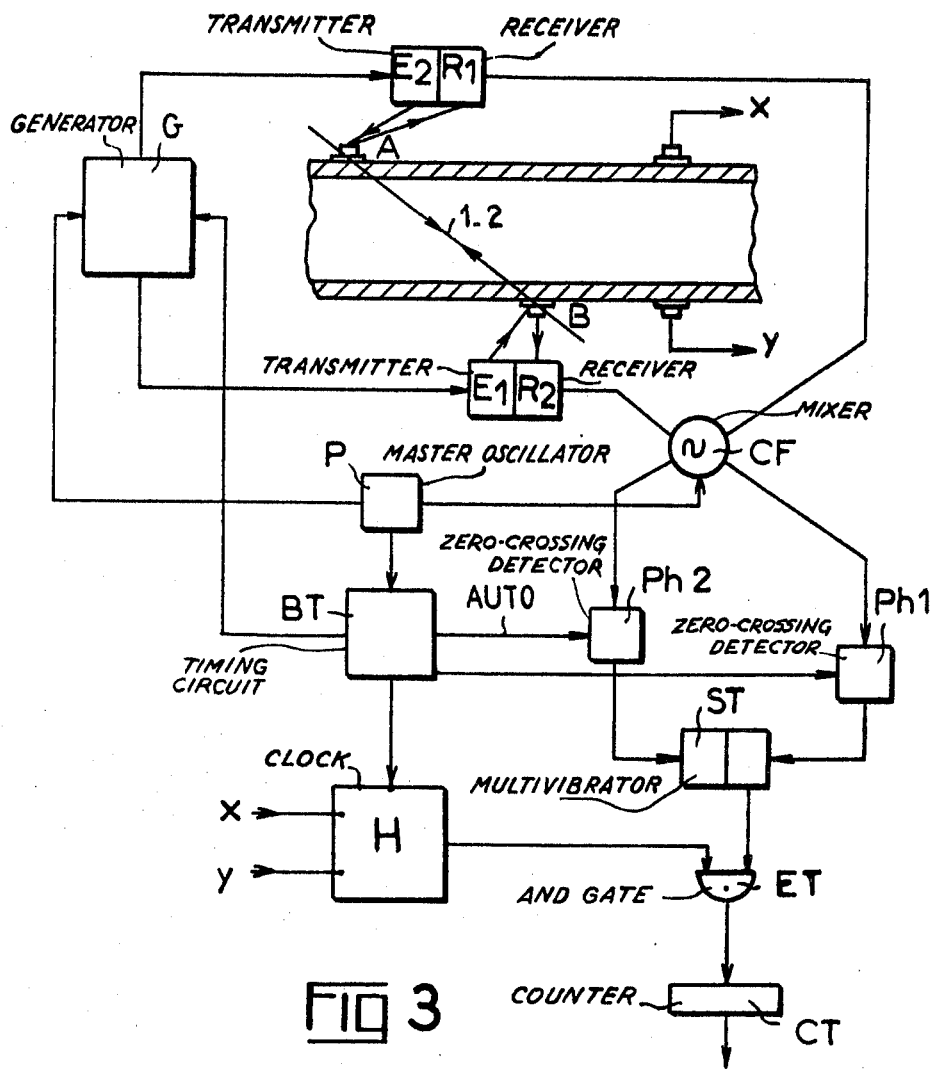

ULTRASONIC FLOWMETERS

The present invention relates to improvements in ultrasonic flowmeters.

Flowmeters are devices used to measure the flow velocity of a fluid through a pipe of known diameter and hence, by a a simple calculation, to indicate the flow rate. In the case of ultrasonic flowmeters, the measurement is effected sequentially or continuously, without contact with the fluid and thus without modifying the flow conditions to which it is subjected.

One known ultrasonic method of measuring the flow velocity of a fluid consists in comparing the times of propagation of two acoustic waves passing obliquely through the fluid, one in the upstream direction and the other in a downstream direction. Moreover, it is also necessary to measure the velocity of sound in the fluid, since this velocity varies unpredictably from one instant to another, for example as a consequence of temperature variations, and the difference between the acoustic propagation times of the upstream and downstream waves is a function of this parameter.

In several prior art flowmeters, the flow velocity of the fluid with compensation for the variations of the acoustic propagation velocity therein is obtained with the help of analogue type electrical or electronic circuits. These circuits are not very accurate in particular when using devices such as analogue phase comparators whose response curve is non-linear or which may exhibit drift while in operation. It would equally be possible to carry out such measurements by means of purely digital circuits. Their accuracy would be improved, but the measurement would not be fast enough and would require bulky and complex equipments.

The flowmeter in accordance with the invention employs a hybrid circuitry, partly analogue, partly digital and carries out measurements at great speed and while employing relatively simple equipment.

According to the invention, there is provided an ultrasonic flowrate meter for cyclically measuring the rate of flow of a fluid in a pipe, comprising in combination:

first means for generating a timing signal and a short starting pulse at the beginning of each measuring cycle;

second means controlled by said first means for repeatedly delivering an electrical wave train;

at least one first pair of opposed transducer means located on opposite sides of said pipe on an axis obliquely inclined with respect to the flow direction, alternately for generating ultrasonic waves from said electrical wave train and transmitting said waves along said oblique axis in both the upstream and downstream directions, and for receiving said transmitted waves and converting said received waves into a first and a second electrical signal;

third means for generating from said first and second signals a rectangular pulse waveform having a duration substantially equal to the difference between the upstream and downstream propagation time intervals of said ultrasonic waves;

a second pair of opposed transducer means located transversally with respect to the axis of said pipe, including a transmitting transducer having an input for receiving an electrical pulse and an output for delivering a sonic wave and a receiving transducer having an input for receiving said sonic wave and an output;

an amplifier having an input coupled to said receiving transducer output and an output coupled to said transmitting transducer input, said second transducer pair and said amplifier forming a feedback loop for generating a first pulse train having a pulse repetition frequency proportional to the velocity of sound through said fluid;

fourth means for applying said short starting pulse from said first means to said transmitting transducer input;

fifth means for deriving from said first pulse train a second pulse train having a pulse repetition frequency varying about a predetermined resting frequency as a function of the square of said first pulse train repetition frequency, gating means controlled by said rectangular pulse waveform for transmitting said second pulse train; and means for counting the pulses of said second train fed by said gating means.

This and other features and advantages of the present invention will become apparent from the following description given by way of exemple, with reference to the accompanying drawings in which :

FIGS. 1 and 2 illustrate two arrangements of acoustic transducers which can be associated with a fluid pipe ;

FIGS. 3 and 4 illustrate the block diagram of a flowmeter in accordance with the invention ;

Figure 4:
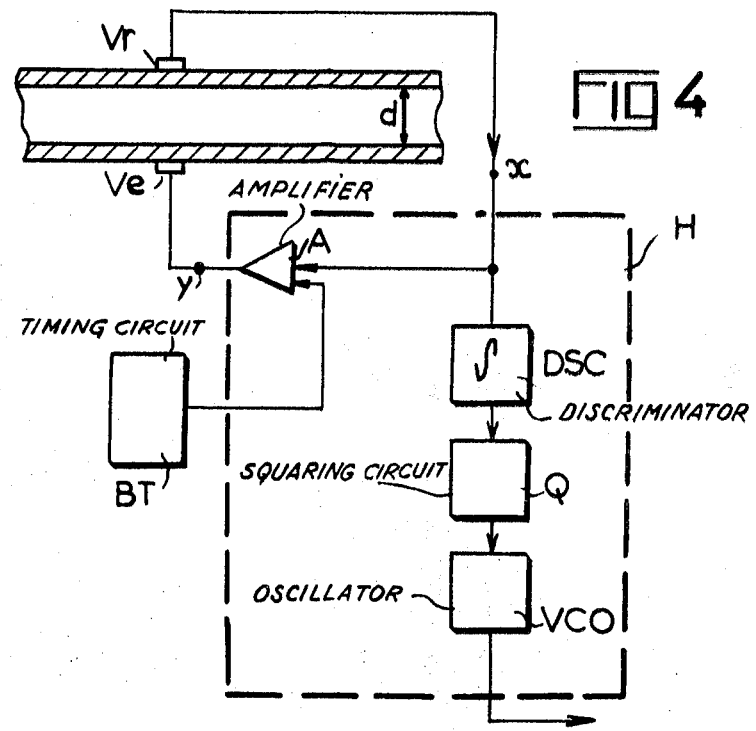

The flowmeter in accordance with the invention derives flow velocity of a fluid, and consequently the flowrate (volume per time) thereof, from the measurement of the time taken by acoustic waves to propagate along different trajectories through the fluid. Thus, FIG. 1 illustrates a section of pipe of diameter $d$, in which fluid F is flowing in the direction of the arrow. Three acoustic links or trajectories have been provided : an upstream link 1, oblique in relation to the axis of the pipe and oriented substantially opposite the flow direction, a downstream link 2 oriented substantially in the flow direction and obliquely thereto, with the same angle $\theta$ relative to the pipe axis as the upstream one and a transverse link 3 directed across the pipe. Three pairs of piezoelectric transducers or vibrator V are located outside the pipe respectively opposite the ends of the acoustic links or paths 1, 2 and 3. In each pair, one transducer is used to produce acoustic waves on the links from electrical signals, and the other to convert the acoustic waves back to electrical signals.

In the embodiment illustrated in FIG. 2, acoustic waves can propagate in both the upstream and downstream directions along the same oblique link or trajectory 1–2. The two vibrators V, respectively located at the ends of said trajectory, are designed to be simultaneously excited by an electrical signal whose duration is shorter than the acoustic propagation time therebetween, so that said vibrators revert to the rest condition sufficiently early to receive and convert the acoustic waves respectively transmitted by the opposite ones into electrical signals. This arrangement has the advantage of economizing on two vibrators.

The acoustic waves propagate at the velocity $v1 = (c-v)$ over the upstream trajectory 1, $v2 = (c+v)$ over the downstream trajectory 2 and $v3 = c$ over the diametrical trajectory 3, $c$ being the velocity of sound in the fluid whilst $v$ is the component of the fluid flow velocity at the angle $\theta$, the latter being the angle of inclination of the oblique links or trajectories.

The result is that the signals emerging from the oblique links exhibit between one another a delay or phase shift which is proportional to the difference between the acoustic propagation times, $T_1$ and $T_2$.

For oblique links having the same length L this difference is : $T_1 - T_2 = L/(c-v) - L/(c+v) = 2 Lv/(c^2-v^2)$.

Knowing that $c$ may range between 1,000 and 2,000 meters per second and that $v$ is generally less than 100 meters per second, it is reasonable to say that $v^2$ is negligible compared to $c^2$ and that $T_1 - T_2$ is inversely proportional to the square of the velocity of sound in the fluid.

The velocity of sound varies at any instant in an unpredictable manner, for example with temperature ; consequently, if it desired to determine the flow velocity of the fluid from the difference between the acoustic propagation times over two oblique links, it is necessary to measure the speed of sound in the fluid at the instant of measurement. The transverse link 3 is provided for this purpose.

In the flowmeter in accordance with the invention, means are provided for generating a rectangular pulse waveform, the duration of which is proportional to $I_2 - T_1$. The duration of said pulse is measured by counting the pulses produced by a clock (i.e. a variable frequency pulse generator), whose frequency is controlled as a function of the velocity of sound in the fluid C. For this purpose, a circuit is provided including the transverse link 3, the clock pulse repetition frequency being such that the number of clock pulses contained within the duration of the rectangular pulse waveform is proportional to the flow velocity of the fluid, the term of sound velocity C having been eliminated.

In FIG. 3 a fixed frequency master oscillator P feeds both a timing circuit BT which controls and synchronizes the measuring process and a generator G. The timing circuit BT controls the generator G for producing a pulse modulated sinusoidal signal i.e., recurrent wave trains, said signals having the frequency controlled by the master oscillator P. By means of two transmitters E1 and E2, generator G simultaneously supplies a pulsed sinusoidal wave train to both transducers A and B. The transducers convert these voltage wave trains into acoustic pulsed wave trains which travel in opposite directions through the fluid F along the link or trajectory 1-2. The wave train transmitted by each transducer is received by the opposite one. The thus received acoustic wave trains are then converted to sinusoidal pulsed voltage wave trains.

These voltages are respectively amplified by amplifiers R1, R2, and then converted to a lower frequency; to this end, the outputs of the amplifiers R1, R2 are connected to the inputs of a mixer CF or heterodyne frequency converter CF receiving an intermediate frequency generated by the master oscillator P. The frequency conversion does not alter the relative phases of the pulsed wave trains but simply makes it easier to measure their relative phase shift. The two outputs of the frequency changer CF are respectively connected to devices Ph1 and Ph2.

Each device Ph1 or Ph2 produces a pulse of short duration at the instant at which the voltage applied to it passes through zero in a selected positive-going or negative-going sense and is generally called a zero crossing detector.

The parameters involved in the delay measurement, in particular the frequency of the signals, are selected so that the phase shift between two received signals does not exceed 360°; this avoids ambiguities and makes it possible to carry out the time difference measurement between any one of the respective half-waves of the converted sinusoidal signals. An enabling or authorizing circuit "Auto" detectors is provided between the timing circuit BT and the detectors P$h$1 and P$h$2 far their unblocking, in order to determine the respective half-waves between which measurement is to be effected.

The delay measurement is effected by digital means.

The pulses coming from the detectors P$h$1 and P$h$2 trigger a bistable trigger circuit ST which produces a rectangular pulse waveform of length proportional to the phase shift between the signals received by said zero cross detectors. The first pulse received triggers the bistable circuit from its state 0 to its state 1 and the second one resets it to the O state. Thus a rectangular pulse waveform is produced, the duration of which is equal to the time interval between the pulses respectively delivered by detectors P$h$1 and P$h$2. This rectangular waveform is supplied to one of the inputs of an AND-gate whose other input is supplied with the pulses from the clock H, which will be described hereinafter with reference to FIG. 4 of the drawings, and, whose period is a function of the square of the velocity of sound in the fluid. The output of the AND-gate is connected to a counter CT which, by counting the number of clock pulses produced during rectangular pulse indicates the flow velocity of the fluid.

As a matter of fact, the count of counter CT is equal to $(T_2 - T_1) \times f$; $f$ being proportional to $1/c^2$, i.e., is proportional $2 Lv$, L being constant.

An embodiment of the clock H is shown in FIG. 4.

The clock H is controlled by a feedback loop comprising the transverse acoustic link 3 composed of two transducers $V_e$ and $V_r$ and a two input amplifier A, whose one input is connected to $V_r$ and whose output is connected to $V_e$. The operation of transducers Ve and Vr is triggered when the timing circuit BT supplies a pulse to the other input of the amplifier A at the beginning of each measuring process. This electrical pulse is amplified by amplifier A. The amplified pulse is converted into a sound signal by transducer Ve. The transmitted sonic pulse is received after a time interval T by transducer Vr, and converted into an electrical pulse fed to the first input of amplifier A wherefrom the amplified pulse is fed back to the transmitting transducer $V_e$ and the operation continues permanently. At an arbitrary point in the loop, it is thus possible to pick up a pulse train, the frequency F of which is reciprocal to the acoustic propagation time $T$ over the link 3, or in other words equal to the ratio of the velocity of sound $c$ to the diameter $d$ of the pipe $F = 1/T = c/d$. From this it will be seen that the frequency $F$ is proportional to the velocity of sound.

Pulses taken from the feedback loop are received by a frequency discriminator DSC which produces an error voltage varying as a function of the variations of the frequency $F$, about a center frequency $F_o$ to which the discriminator is tuned. This voltage is a function $U = U_o + a(F-F_o)$.

This error voltage $U$ is applied to a squaring circuit $Q$ which produces a voltage $V = U^2 = [U_o\, a\, (F-F_o)]^2$ which controls the frequency of a voltage-controlled variable frequency oscillator VCO.

Thus, the oscillator VCO produces signals whose frequency is proportional to the square of the velocity of the sound i.e., which varies inversely with respect to the variation with sound velocity of the difference between the upstream and downstream sound propagation time intervals $T_1$ and $T_2$.

From this signal are derived pulses having the same frequency. These pulses are applied to the second input of the AND-gate shown in FIG. 3. The variation which affects the frequency of the pulses, on the one hand, and the length of the rectangular pulse representing the difference between the times $T_1$ and $T_2$, on the other, have the effect of compensating for errors due to fluctuations in the sound velocity $c$. When the counter CT counts the number of pulses contained in said rectangular pulse. Conquequently, the counter CT counts a number which is proportional to the fluid flow velocity, and from which the term $c$ is eliminated.

It should be borne in mind that an additional corrective term which is a function of parameters likely to disturb distribution of velocities in the pipe, for example viscosity, can be introduced, by controlling the center frequency of the discriminator DSC, for example by suitably tuning one of the circuits which make it up, or for that matter by any other means.

In accordance with a particular arrangement of the flowmeter in accordance with the invention, a single electronic circuit similar to that shown in FIG. 3 is used to effect measurements across several oblique acoustic links.

These links are provided on the same pipe.

Figure 5:
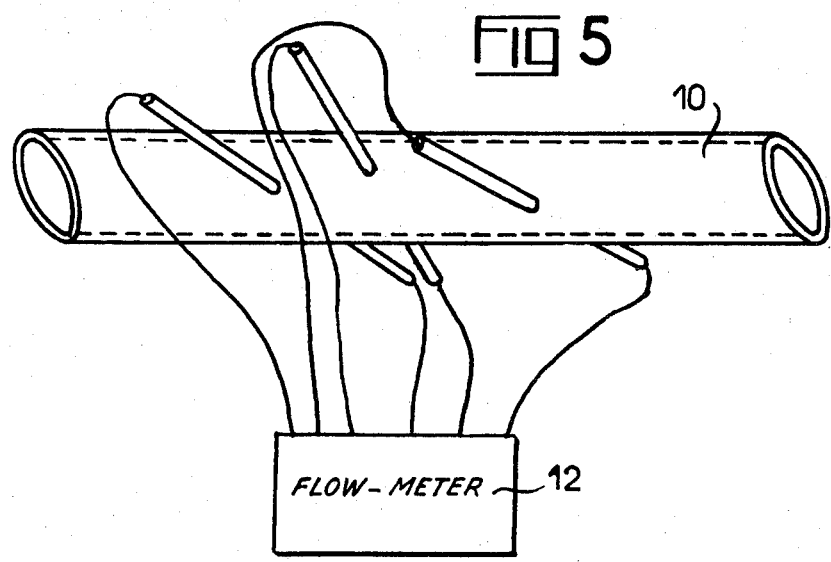
FIG. 5 shows an arrangement comprising several groups of transducers for transmitting and receiving acoustic beams obliquely with respect to the flow direction.

FIG. 5 illustrates by way of example a pipe 10 traversed at different angles by oblique links intersecting the pipe axis or otherwise. Measuring heads assembled at the ends of the links or paths are served by a single electronic unit 12. Measurement of the different trajectories can be effected simultaneously at different frequencies, or sequentially using the same frequency.

The diversity of the results measured by the several oblique links on the same pipe, provides a better indication of the peculiarities of the flow rate, and produces more accurate measurements. The links can be distributed along the pipe and passed through it at identical angles or at different angles. The links may even be contained in a same plane, which does not contain the axis of the pipe; Where such links are essentially traversing the external ring of the section of the fluid, they are able to pick up variations in the viscosity of the fluid and indicate their effects upon the velocity distribution curve of said fluid inside the pipe. The spread in the measurements makes it possible to introduce a certain correction because of the fact that the velocities detected in the peripheral fluid ring can be weighted differently.

Figure 6:
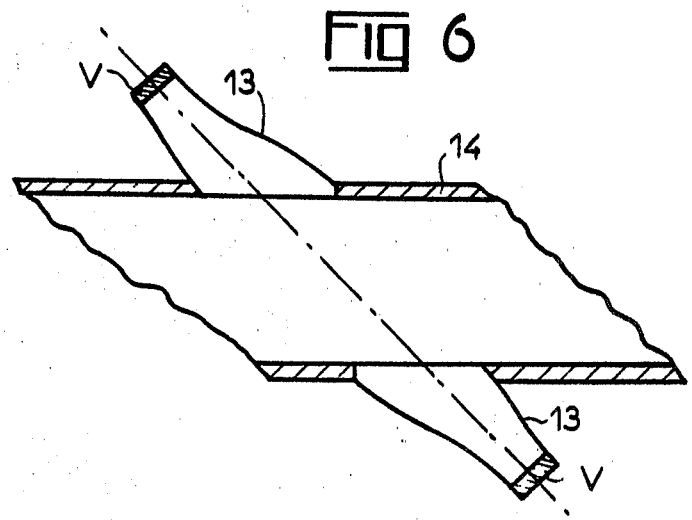
FIG. 6 shows a way of mounting transducers on a pipe.

One of the advantages of the flowmeter in accordance with the invention arises from the fact that the measuring process employs the difference between acoustic transmission times over the upstream and downstream acoustic links; this advantage allows to locate the vibrators at a certain distance from the wall of the pipe. Thus, in FIG. 6, the vibrators V constituted for example by plates of quartz or piezoelectric ceramics, are assembled at the ends of necks 13 projecting from the wall (the latter is drastically thinned at this location) of the pipe 14. The acoustic waves propagate over the height of the necks in a time which is the same for both the upstream and downstream directions. Thus, whatever the height of the necks, the difference between the acoustic propagation times in the upstream and downstream trajectories, will be due solely to the effects of the fluid and not to the necks.

The artifice of placing the vibrators away from the wall, makes it possible to cool them. This is a desirable feature where the fluid concerned is hot since, beyond 300° C, there is a risk that the Curie point will be exceeded, beyond this point the vibrators losing their piezoelectric properties. Moreover, the necks 13 can do duty as an acoustic impedance matching device and produce a directional effect which narrows down the main lobe and reduces the size of the secondary lobes.

Figure 7:
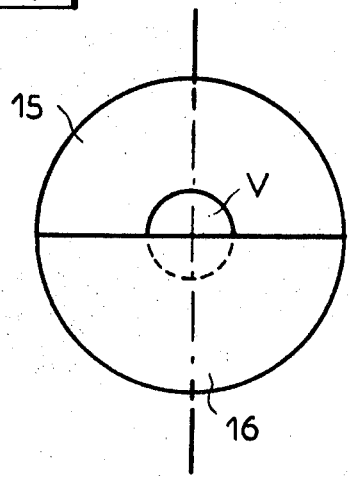
FIGS. 7 and 8 illustrate a transducer mounting arrangement for avoiding the reflection of acoustic waves coming from the opposite transducer.
Figure 8:
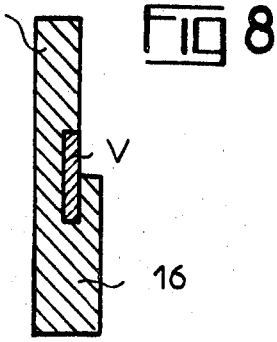

In an other embodiment undesired reflection of the acoustic waves are prevented. This arrangement is shown in plan view in FIG. 7 and in section X—X, in FIG. 8. The vibrator V is assembled at the center of a disk-shaped mounting member 15. One half of the surface of this mounting member 15 facing the associated opposite vibrator (not shown) is substantially flush with the vibrator it contains, the other half thereof having an additional thickness of $\lambda/4$ $\lambda$ being the acoustic wave length in the fluid. This means that there is a phase difference of $\lambda/2$ between the acoustic waves respectively reflected by the two halves of the surface of mounting member 15. The reflected acoustic waves from both halves travelling towards the opposite transducer have a certain dispersion so that they practically cancel each other out before reaching it.

The foregoing description shows how the flowmeter in accordance with the invention uses simultaneous measurement over two oblique links and a transverse link. The result of these measurements is thus produced in a very short time compared to the time needed if the measurements are carried out successively.

These features are advantageous in the case where the flow velocities are liable to exhibit certain jumps for example when the pipe diameter is small. Finally, the flowmeter comprises fast-operating electronic circuits which are very simple and small in number, and which utilize both analogue and digital processes. The overall result is that the flowmeter gives extremely accurate and faithful measurements, bearing in mind its simplicity and the speed with which measurement is carried out.

What I claim is:

1. An ultrasonic flowrate meter for cyclically measuring the rate of flow of a fluid in a pipe, comprising in combination:

first means for generating a timing signal and a short starting, pulse at the beginning of each measuring cycle;

second means controlled by said first means for repeatedly delivering an electrical wave train;

at least one first pair of opposed transducer means located on opposite sides of said pipe on an axis obliquely inclined with respect to the flow direction, alternately for generating ultrasonic waves from said electrical wave train and transmitting said waves along said oblique axis in both the upstream and downstream directions, and for receiving said transmitted waves and converting said received waves into a first and a second electrical signal;

third means for generating from said first and second signals a rectangular pulse waveform having a duration substantially equal to the difference between the upstream and downstream propagation time intervals of said ultrasonic waves;

a second pair of opposed transducer means located transversally with respect to the axis of said pipe, including a transmitting transducer having an input for receiving an electrical pulse and an output for delivering a sonic wave and a receiving transducer having an input for receiving said sonic wave and an output;

an amplifier having an input coupled to said receiving transducer output and an output coupled to said transmitting transducer input, said second transducer pair and said amplifier forming a feedback loop for generating a first pulse train having a pulse repetition frequency proportional to the velocity of sound through said fluid;

fourth means for applying said short starting pulse from said first means to said transmitting transducer input;

fifth means for deriving from said first pulse train a second pulse train having a pulse repetition frequency varying about a predetermined resting frequency as a function of the square of said first pulse train repetition frequency, gating means controlled by said rectangular pulse waveform for transmitting said second pulse train; and means for counting the pulses of said second train fed by said gating means.

2. A meter as claimed in claim 1, wherein said third means comprises:
a master oscillator for delivering a constant frequency sinusoidal wave;
frequency converting means respectively fed by said first and second signals and said constant frequency wave for transposing said signals to a lower frequency;
a first zero crossing detector means for delivering a first pulse corresponding to a zero crossing of said transposed first signal;
a second zero crossing detector means for delivering a second pulse corresponding to the first zero crossing of said transposed second signal consecutive to said first pulse;
and a bistable multivibrator respectively triggered from a first state into a second state by said first and second pulses.

3. A meter as claimed in claim 1, wherein said fifth means comprises: a frequency discriminator circuit coupled to said feedback loop for delivering an error voltage proportional to the difference between said first pulse train repetition frequency and a predetermined center frequency to which it is tuned; a squaring circuit fed by said error voltage for delivering a control voltage proportional to the square of said error voltage; a voltage controlled variable frequency oscillator fed by said control voltage for delivering a wave having frequency variations proportional to the variations of said control voltage; and a pulse generator fed by said voltage controlled oscillator for delivering pulses having the same frequency as said wave.

4. A meter as claimed in claim 1 comprising a plurality of pairs of first and second transducers.

5. A meter as claimed in claim 1, comprising for each transducer, a neck projecting from the wall of the pipe, said neck having an end section in which the transducer is fastened.

6. A meter as claimed in claim 1, wherein each transducer is mounted at the center of a circular disk-shaped mounting member integral with the wall of said pipe, on its side facing the opposite transducer said mounting member having one half of its surface flush with the transducer it holds, the other half thereof having an additional thickness substantially equal to a quaterwavelength of the sound wave propagating through the fluid.

* * * * *